US009979962B2

(12) United States Patent
Simske et al.

(10) Patent No.: US 9,979,962 B2
(45) Date of Patent: May 22, 2018

(54) METHOD AND SYSTEM FOR COMPRESSION OF A REAL-TIME SURVEILLANCE SIGNAL

(75) Inventors: Steven J. Simske, Fort Collins, CO (US); Dalong Li, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 421 days.

(21) Appl. No.: 14/126,573

(22) PCT Filed: Aug. 8, 2011

(86) PCT No.: PCT/US2011/046944
§ 371 (c)(1),
(2), (4) Date: Dec. 16, 2013

(87) PCT Pub. No.: WO2013/022426
PCT Pub. Date: Feb. 14, 2013

(65) Prior Publication Data
US 2014/0146882 A1    May 29, 2014

(51) Int. Cl.
*H04N 19/18*    (2014.01)
*H04N 19/60*    (2014.01)
(Continued)

(52) U.S. Cl.
CPC ......... *H04N 19/00775* (2013.01); *H04N 7/18* (2013.01); *H04N 19/12* (2014.11);
(Continued)

(58) Field of Classification Search
CPC ....... H04N 19/00296; H04N 19/00775; H04N 7/18; H04N 19/87; H04N 19/12; H04N 19/14; H04N 19/18; H04N 19/60
(Continued)

(56) References Cited

U.S. PATENT DOCUMENTS 6,333,986 B1    12/2001    Petty
6,683,984 B1    1/2004    Simske et al.
(Continued)

OTHER PUBLICATIONS

Delian Liu; Xiaorui Wang; Jianqi Zhang; Xi Huang, "Feature Extraction Using Mel Frequency Cepstral Coefficients for Hyperspectral Image Classification", 2010 Optical Society of America, May 6, 2010, vol. 49, pp. 2670-2675.
(Continued)

*Primary Examiner* — On S Mung
(74) *Attorney, Agent, or Firm* — International IP Law Group, PLLC

(57) ABSTRACT

An embodiment provides a method for compression of a real-time surveillance signal. This method includes receiving a signal from a monitoring device and analyzing the signal to be monitored to compute spectral content of the signal. This method also includes computing the information content of the signal and determining a count of a number of coefficients to be used to monitor the signal. This method includes deploying a strategy for computing a plurality of coefficients based on the spectral content of the signal and the count of the number of coefficients to be used for monitoring the signal. This method further includes monitoring the signal and resetting the system in the case of above-threshold changes in a selected portion of the plurality of coefficients.

20 Claims, 5 Drawing Sheets

(51) Int. Cl.
  *H04N 7/18* (2006.01)
  *H04N 19/12* (2014.01)
  *H04N 19/14* (2014.01)
  *H04N 19/87* (2014.01)
  *G08B 13/196* (2006.01)

(52) U.S. Cl.
  CPC ............ *H04N 19/14* (2014.11); *H04N 19/18* (2014.11); *H04N 19/60* (2014.11); *H04N 19/87* (2014.11); *G08B 13/1961* (2013.01); *G08B 13/19667* (2013.01)

(58) Field of Classification Search
  USPC .................................................. 375/240.08
  See application file for complete search history.

(56) References Cited

U.S. PATENT DOCUMENTS

| | | | |
|---|---|---|---|
| 7,180,442 B1 | 2/2007 | Nguyen | |
| 7,310,648 B2 | 12/2007 | Simske et al. | |
| 7,516,064 B2 | 4/2009 | Vinton et al. | |
| 7,711,123 B2 | 5/2010 | Crockett | |
| 7,878,549 B2 | 2/2011 | Simske et al. | |
| 2002/0049584 A1* | 4/2002 | Bruhn ................ | G10L 19/0208 704/205 |
| 2003/0117511 A1* | 6/2003 | Belz ................... | H04N 1/0044 348/333.11 |
| 2005/0123061 A1* | 6/2005 | Smith ................. | H04B 14/004 375/261 |
| 2005/0185850 A1* | 8/2005 | Vinton ................ | G06F 17/147 382/240 |
| 2008/0099565 A1 | 5/2008 | Simske et al. | |
| 2008/0129822 A1 | 6/2008 | Clapp | |
| 2009/0043216 A1 | 2/2009 | Lin et al. | |
| 2009/0144799 A1 | 6/2009 | Simske | |
| 2011/0068181 A1 | 3/2011 | Simske et al. | |

OTHER PUBLICATIONS

Fathi E. Abd El-Samie, "Detection of Landmines from Acoustic Images Based on Cepstral Coefficients", Springer Science+Business Media, LLC, Oct. 30, 2009.

Latif, Rabia, et al., "Hardware-Based Random Number Generation in Wireless Sensor Networks (WSNs)," Adv Inform Sec Assurance, Lecture Notes in Computer Science, vol. 5576, pp. 732-740, 2009.

Shannon, C.E., "A Mathematical Theory of Communication," The Bell System Technical Journal, vol. 27, pp. 379-423 and 623-656, Jul. and Oct. 1948.

Simske, Steven J., "Dynamic Biometrics: The Case for a Real-Time Solution to the Problem of Access Control, Privacy and Security," Presented at the Biometrics, Identity and Security 2009 Int'l Conf., Tampa, Florida, pp. 1-10, Sep. 2009.

Talal, T.M., "Identification of Satellite Images Based on Mel Frequency Cepstral Coefficients," 2009 ICCES Int'l Conf on Computer Engineering and Systems; Cairo, Egypt, pp. 274-279, Dec. 14-16, 2009.

Tello, Marivi, et al., "A Novel Strategy for Radar Imaging Based on Compressive Sensing," 2008 IEEE International Geoscience & Remote Sensing Symposium IEEE IGARSS 2008, pp. II-213-II-216, Jul. 2008.

Vargas, Jesus F., "Offline Signature Verification Based on Pseudo-Cepstral Coefficients," ICDAR 2009 Proc of the 2009 10th Int'l Conf on Document Analysis and Recognition, Washington, D.C., pp. 126-130, 2009.

\* cited by examiner

METHOD AND SYSTEM FOR COMPRESSION OF A REAL-TIME SURVEILLANCE SIGNAL

BACKGROUND

In remote sensing, information about an object may be acquired without making physical contact with that object. For example, a video image of an object may be captured and a corresponding video signal transmitted to a remote monitoring station. Remote sensing may be accomplished through the use of many different types of surveillance systems, including cameras, video recorders, and mobile devices, among others. The transmission of the signals generated by a remote sensing system may use up significant processing power and bandwidth. Further, the storage of these signals may consume large amounts of storage space.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
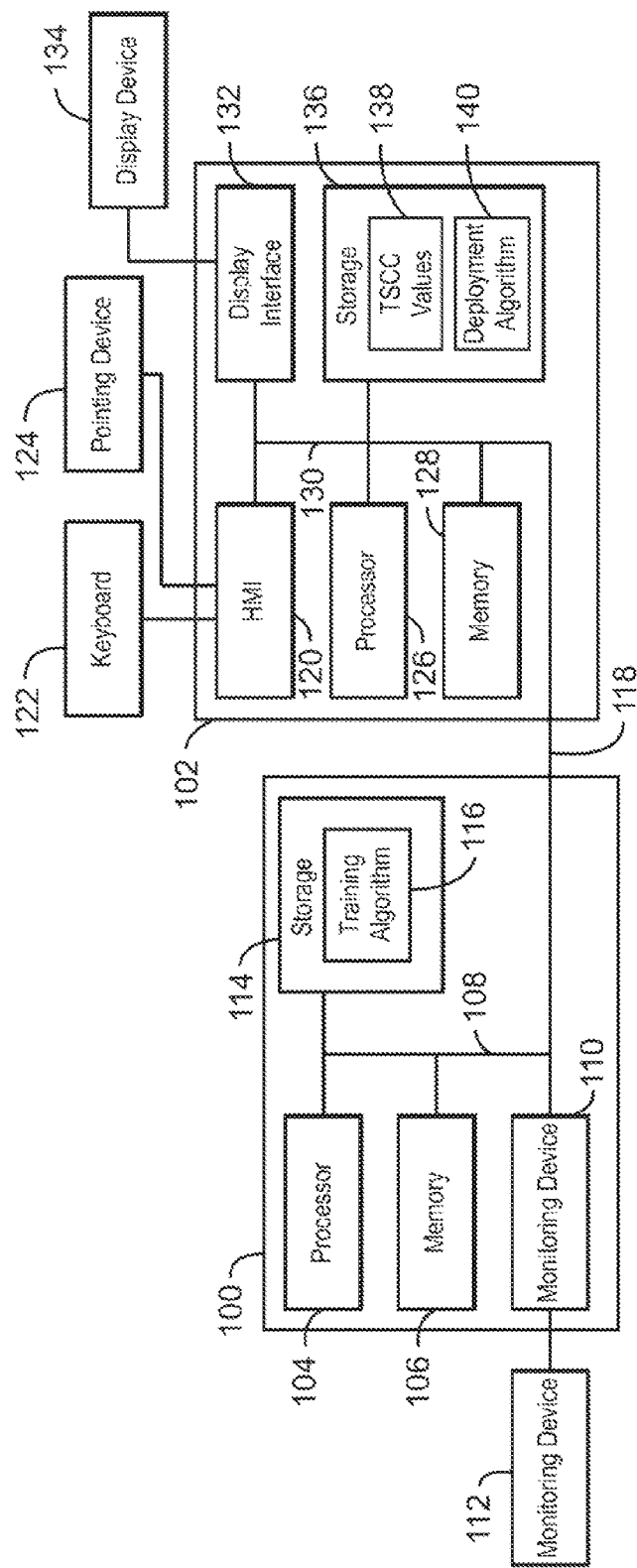
FIG. 1 is a block diagram of a remote monitoring system and a deployment system, in which remotely sensed data from a surveillance system may be compressed and monitored, in accordance with embodiments.

Embodiments described herein provide a system and method for compressing signals from a real-time surveillance system. Real-time surveillance refers to any video monitoring system in which input data is processed within a very short time, usually on the order of a few milliseconds, and is available almost immediately as feedback. Because a signal from a real-time surveillance system often consists of a large amount of static information, data provided by a real-time surveillance system may be largely redundant. As a result, full signal transmission in real-time surveillance systems may use large amounts of energy and storage space to store the redundant data. Generally, the more important information to be extracted of each individual sensor is gleaned from conveying when its signal has changed in a meaningful fashion. In embodiments, a change in the signal may be represented as a difference signal, which may serve as an indication of the amount of non-static information detected by the real-time surveillance system. The calculation and transmission of a difference signal for the surveillance system may be sufficient for many remote monitoring purposes.

In accordance with embodiments, an incoming signal from a monitoring device is reduced to a compressed data stream for efficient monitoring of remote sensors, such as two-dimensional image sensors used for video and image surveillance systems. The compressed data stream may include values for task-specific cepstral coefficients (TSCCs), which may be continuously computed to monitor changes in the signal. A cepstrum is defined as a Fourier Transform (FT) of the log spectrum of the signal. However, a cepstrum still has the same frequency behavior as a spectrum, i.e., the coefficients are integral multiples of each other, after the input axis has been transformed. A Fourier Transform, in general, is a mathematical operation used to decompose a signal into its constituent frequencies. TSCCs may be computed from the cepstral calculations by performing Fourier Transformations on an altered form of the original signal, such as a simple, logarithmic transformation of the spectrum or any other type of transformation of the spectrum. For example, in an embodiment, the original cepstrum may be based on a non-linear, non-log transformation that is only ruled by monotonicity. The input axis may be linearized, so that each equal increment on the axis corresponds to the same incremental area under the energy spectral density (ESD) curve in the original spectrum. Once the signal has been transformed, the new, post-transformation axis will be treated as if it were a linear axis.

As used herein. TSCCs may be determined using Shannon's theory for communication in conjunction with the normalized spectral density. Shannon's theory is a type of information theory that measures the amount of information that is transmitted by a signal. Also, as an example, Shannon's theory may be used to describe the maximum rate at which information may be transmitted over a communications channel of a specific bandwidth in the presence of noise.

This method may be useful for remote signals that either are not expected to change much or else should trigger a downstream event when there is a significant change. As discussed above, there is generally no reason to capture full video or image data when only the changes in the video or image signal are of real interest. Efficient compression of the incoming signal of the video or image data stream, as disclosed by the current method, may allow for more effective and less costly surveillance systems. A method in accordance with the techniques disclosed herein may be divided into two components: a training phase and a deployment, or run-time, phase.

During the training phase, an incoming signal from a surveillance system may be analyzed to determine the mode to be used for compressing and monitoring the signal. During the deployment phase, the signal may be monitored in a continuous feedback loop. Furthermore, changes in the signal may be monitored such that if changes in the signal (i.e., in the transformed space) greater than a specified threshold occur, the system may be reset and the signal analyzed at a higher bandwidth. This method for compression of real-time surveillance data allows for the effective monitoring of a signal with a balance between bandwidth reduction and signal change sensitivity.

In an embodiment, the current system may be used to privately send monitoring information across a non-secure connection without encryption overhead. This is afforded due to the fact that the image signal is translated by the current system into a signal bearing content that is related to the changes in the image signal and not the actual image itself. In effect, the output of the signal processing from the training phase is a hash of the original input signal, making it virtually impossible to deduce the contents of the input signal from the processed output signal, which includes the TSCC spectrum. In addition, different transformations of the input signal may be used to achieve an entropic output which effectively obfuscates the original contents of the input signal.

FIG. 1 is a block diagram of a remote monitoring system 100 connected to a deployment system 102. The remote monitoring system 100 may be used to compress remotely sensed data from a surveillance system during a training phase of the system, in accordance with embodiments. The deployment system 102 may be used to receive the compressed remotely sensed data signal and use the signal to control a deployment stage of the system. The remote monitoring system 100 may include a processor 104 that is adapted to execute non-transitory, computer readable instructions, as well as a memory device 106 that stores instructions that are executable by the processor. The processor 104 may be a single core processor, a multi-core processor, a computing cluster, or any other suitable configuration. The memory device 106 may include random access memory (RAM), read only memory (ROM), flash memory, or any other suitable memory system. The remote monitoring system 100 may be connected through the bus 108 to a monitoring interface 110 adapted to connect the system to a video or imaging monitoring device 112. The monitoring device 112 may include a camera, computer, mobile device, webcam, or any combination thereof.

The instructions implemented by the processor 104 of the remote monitoring system 100 may perform a process for analyzing and compressing the signal from a real-time surveillance system during the training phase through the determination of a specified number of TSCCs. The remote monitoring system 100 may also include a storage device 114 adapted to store the training algorithm 116 for the compression of the input signal from the monitoring device. The remote monitoring system 100 may be connected to the deployment system 102 through the use of a wired or wireless connection system 118. Non-limiting examples of a connection system 118 include a local area network (LAN), wide area network (WAN), or the Internet.

The deployment system 102 may be used to monitor changes in the TSCC values for the remotely sensed data signal during a deployment phase of the system, in accordance with embodiments. A human machine interface 120 within the deployment system 102 may connect the system to a keyboard 122 and pointing device 124, wherein the pointing device 124 may include a mouse, trackball, touchpad, joy stick, pointing stick, stylus, or touchscreen, among others.

The deployment system 102 may include a processor 126 that is adapted to execute non-transitory, computer readable instructions, as well as a memory device 128 that stores instructions that are executable by the processor. The processor 126 may be a single core processor, a multi-core processor, a computing cluster, or any other suitable configuration. The memory device 128 may include random access memory (RAM), read only memory (ROM), flash memory, or any other suitable memory system. The deployment system 102 may also be linked through the bus 130 to a display interface 132 adapted to connect the deployment system 102 to a display device 134, wherein the display device 134 may include a computer monitor, camera, television, projector, or mobile device, among others.

The instructions implemented by the processor 126 of the deployment system 102 may perform a process for continuously monitoring the TSCC spectrum of the remote monitoring input signal for the occurrence of above-threshold changes in the coefficient values. If above-threshold changes are detected, the signal may be reanalyzed at a higher bandwidth. The deployment system 102 may also include a storage device 136 adapted to store the TSCC values 138 and a deployment algorithm 140 for monitoring the TSCC values and responding to above-threshold changes, for example, by creating a different transformation. The storage device 136 may include a hard drive, an optical drive, a thumbdrive, an array of drives, or any combinations thereof. Through the connection system 118, the deployment system 102 may instruct the remote monitoring system 100 to continue monitoring or appropriately respond to changes in the TSCCs.

In an embodiment, the cepstral-based method discussed herein may be used for a variety of applications, including remote sensing, surveillance, and other multi-sensing applications. In addition, the current method may be used for patient monitoring or for a number of other suitable applications, such as for inspection and quality assurance in imaging. For example, in the case of electrocardiography (ECG) monitoring for medical purposes, different TSCC deployment strategies may be used to observe and respond to events in an episode of atrial fibrillation or premature ventricular contraction. Any stationary surveillance system which is not of high interest at all times may benefit from the use of this method to save energy and reduce costs.

In another embodiment, the current method may be used for surveillance systems which involve moving cameras that constantly scan the same area by breaking the captured video into multiple frames and calculating difference signals for each individual frame. Then, if there are regions of higher or lower interest in the area being scanned by the camera, the threshold values for the difference signals or the appropriate downstream reaction to be triggered if the threshold is exceeded in each region may be set accordingly.

Figure 2:
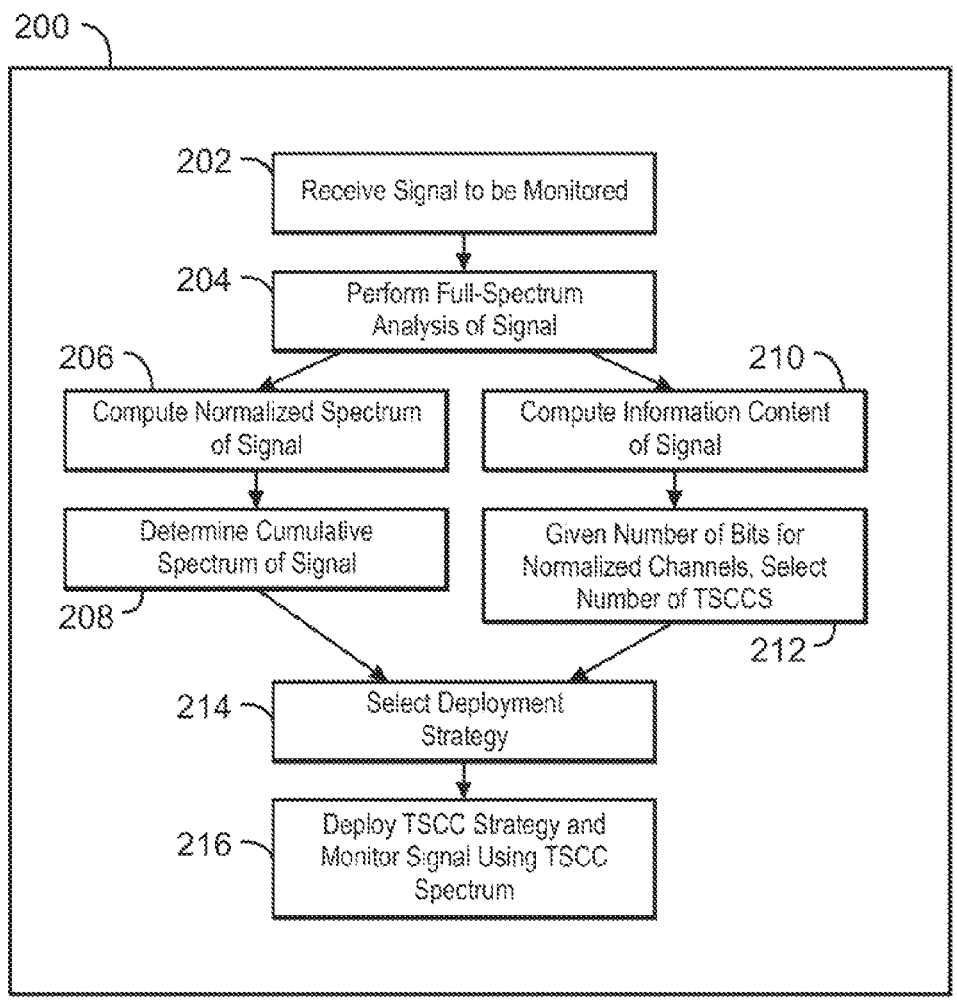
FIG. 2 is a process flow diagram showing the training phase of a method for compressing signals from a real-time surveillance system, in accordance with embodiments.

FIG. 2 is a process flow diagram 200 showing the training phase of a method for compressing signals from a real-time surveillance system. At block 202 of the training phase, a signal is received from a monitoring device. This input signal is broadly sampled to obtain the full set of data from the input image or video.

At block 204, a full-spectrum analysis of the signal to be monitored is performed to generate a full spectrum of the monitored signal. This full spectrum is a representation of the video or image signal in terms of frequencies. In embodiments, the spectrum is determined according to Eqn. 1.

$$\text{Spectrum} = S = \Sigma_{i=0}^{2^N-1} W(i*f_s) \qquad \text{Eqn. 1}$$

In Eqn. 1, $W(i*f_s)$ is the weight, or coefficient, of the spectral component at frequency $(i*f_s)$. The full spectrum contains $2^N$ elements, which may be calculated for $i=0, 1, \ldots, 2^N-1$. After the full spectrum of the signal has been obtained, the system may perform the processes described in relation to blocks 206 and 208 in parallel with processes described in relation to blocks 210 and 212.

At block 206, the normalized spectrum of the signal may be calculated. In an embodiment, the normalized spectrum may be computed according to Eqn. 2.

$$\text{Normalized Spectrum} = \hat{S} = \Sigma_{i=0}^{2^N-1} \hat{W}(i*f_s) = 1.0 \qquad \text{Eqn. 2}$$

In Eqn. 2, $\hat{W}(i*f_s)$ is the normalized weight, or coefficient, of the spectral component at frequency $(i*f_s)$.

At block 208, the cumulative spectrum of the signal may be computed from the normalized spectrum. In an embodiment, the cumulative spectrum may be calculated using Eqn. 3 as shown below.

$$\hat{S}_x = \Sigma_{i=0}^{X} \hat{W}(i*f_s); \forall X \in \{0, \ldots, 2^N-1\} \quad \text{Eqn. 3}$$

In Eqn. 3, $\hat{S}_x$ is the cumulative spectrum of the signal, which is computed from the normalized spectrum of the signal. The cumulative spectrum of the signal may be determined for a range of frequency values, and the frequencies at which the cumulative spectrum reaches certain predetermined values may be recorded as specific, uniformly-spaced cepstral frequencies for the spectrum. The predetermined values at which the cepstral frequencies may be recorded are determined based on the deployment strategy which is used to analyze the signal, as discussed below.

At block 210, the information content of the signal may be, computed. In embodiments, Shannon's communication theory may be used to generate the information content, as shown in Eqn. 4.

$$\frac{\text{bits}}{\text{channel}} = N_b = -\sum_{i=1}^{2^N} p_i * \log_2(p_i) \quad \text{Eqn. 4}$$

As shown above in Eqn. 4, Shannon's communication theory may be used to provide a direct measurement of the number of bits of information in a channel, where $N_b$ denotes the number of bits per channel. According to Eqn. 4, the signal, typically after Fourier Transform filtering, has $2^N$ coefficients $p_i$, $i=1, \ldots, 2^N$, which are stored in a normalized histogram (i.e., an energy spectral density, or ESD) comprising these $2^N$ elements. The sum of all $2^N$ coefficients is 1.0. Adjustment of the value of $2^N$ may be performed by oversampling of the input video or imaging signal, to increase the value of N, or reduced sampling, to decrease the value of N, based on the measured spectral contents of the signal. Adjustment made to the sampling, in terms of the number of coefficients, $2^N$, or the base frequency, should not significantly affect the value of $N_b$. In other words, oversampling or reduced sampling of the signal should not affect the information content of the signal.

At block 212, the minimum number of bits for the normalized, one-bit sampled channels, $N_b$, may be utilized to determine the appropriate number of TSCCs for the signal. The specific number of TSCCs which may be used for each signal is determined at block 210 by Eqn. 5, as shown below.

$$N_C = \text{roof}(K*N_b) \quad \text{Eqn. 5}$$

In Eqn. 5, $N_C$ is the number of TSCCs that may be used to represent the signal, and K is a sensitivity parameter. The larger the value of K is, the more sensitive the TSCCs may be. The "roof" function means that the number of coefficients, $N_C$, is equal to the minimum integer that is higher than the value of the number of bits per channel, bits per sensor, or bits per image, denoted $N_b$. The number of bits per channel is normally a floating point number, while the number of TSCCs is an integer. Therefore, according to Eqn. 5, if $N_b$=4.6, then $N_C$=5. It is necessary to train K for each application using training data, because an improper K will lead to unacceptable performance. For example, if $N_b$ is computed as 4.6 in one video frame and as 4.9 in the next video frame, and the value of K is set as 1 for both video frames, $N_c$ will be the same or both cases. Then, the ability to differentiate between the two video frames has been lost, even though the contents of the two frames may be significantly different from each other. For example, one video frame may consist of background, while the other video frame may contain a foreground object. The number of TSCCs to be used for a particular signal determines the bandwidth used for signal monitoring, since each of the TSCCs will be continuously monitored to detect any changes in value.

At block 214, a deployment strategy may be chosen for the system. The appropriate deployment strategy may be chosen by considering the cumulative spectrum of the signal as determined at block 210 and the appropriate number of TSCCs for the signal as determined at block 212. In an embodiment, a set of cepstral frequencies, $F_C$, with $N_C$ elements may be defined for the deployment phase. Various strategies may be used to determine the values of the cepstral frequencies, including an Optimal-Spread approach, a Median-Band approach, a Jitter approach, an anticipatory approach, or a tiled approach, each of which is described further below. The strategy that is used to define the cepstral frequencies determines the method of computing the values of the $N_C$ TSCCs thereafter.

In an embodiment, an Optimal-Spread approach may be used as a deployment strategy. For this strategy, the elements of $F_C$ are spaced evenly throughout the cumulative spectrum of the signal. In other words, the distances between 0.0, each of the successive cumulative magnitudes, and 1.0 are all equal. For example, when $N_C$=5, the elements of $F_C$ are {0.167, 0.333, 0.5, 0.667 and 0.833}. The set of Optimal-Spread $F_C$ may be calculated according to Eqn. 6 as shown below.

$$\{F_c(\text{Optimal}-\text{Spread})\} = \left\{\frac{1}{N_c+1}, \frac{2}{N_c+1}, \cdots, \frac{N_c}{N_c+1}\right\} \quad \text{Eqn. 6}$$

The Optimal-Spread approach may be a useful deployment strategy for a relatively static signal, since the TSCCs are maximally spaced over the sampled range.

In another embodiment, the Median-Band approach may be used for the deployment strategy. For this method, the cumulative spectrum is divided into $N_C$ bands, and the $F_C$ elements are chosen from the midpoints of the bands. For $N_C$=5, the elements of $F_C$ are {0.1, 0.3, 0.5, 0.7 and 0.9}. The set of Median-Band $F_C$ may be calculated using Eqn, 7.

$$\{F_c(\text{Median}-\text{Band})\} = \left(\frac{0.5}{N_c}, \frac{1.5}{N_c}, \cdots, \frac{N_c-0.5}{N_c}\right) \quad \text{Eqn. 7}$$

Once the set of Median-Band $F_C$ has been calculated, effective monitoring of the channel may be accomplished by transmitting only the magnitudes of the cepstral coefficients. The Median-Band approach may be well suited for signals that are likely to experience unexpected and non-uniform changes in the spectrum, since no sample in the range is further than $0.5/N_C$ of the range from a TSCC. This maximum distance of the sample from the TSCCs is referred to as the Max Distance of Sample from Coefficient, or MDSC.

Although the original spectrum may not have a strong response (large spectral coefficient) at one or more of the cepstral frequencies, the Optimal-Spread and Median-Band techniques, among others, may effectively translate the degrees of freedom indicated from Shannon theory into a cepstral set governed by a signal-specific set of rules. Thus, the sets of cepstral frequencies found according to the Optimal-Spread strategy, Median-Band strategy, or any number of other strategies, may represent the TSCC sets effectively. In other words, regardless of whether the original spectrum has its strongest response at the cepstral coefficients, the TSCC coefficients may map across the range and provide a useful spectrum-monitoring set.

In an embodiment, a Jitter approach may be used as a deployment strategy, wherein a small deviation from Optimal-Spread or Median-Band approaches may be used to incorporate security information. In another embodiment, an anticipatory approach may be used for the deployment strategy, wherein the location of the TSCCs is biased toward bands of the spectrum where the signal is most likely to change. For example, the location of the TSCCs may be biased towards low frequencies for surveillance systems, so that random noise or minor changes in the visual image do not set off alarms or cause other downstream events within the deployment phase. In yet another embodiment, a tiled approach may be used for the deployment strategy, wherein a signal is broken up into multiple spectra by location, for example, doorways and windows for a surveillance system.

The availability of multiple strategies for the deployment phase ensures that an appropriate strategy may be utilized for each individual task according to user preferences. For example, different types of images or videos may belong to different classes based on different features, including image content, contrast, intensity, saturation, or hue, among others. In other words, the input signal may be represented in different ways in order to find the method for determining the cepstral coefficients. The deployment strategy which is chosen to represent a given signal also determines the level of sensitivity of the system. For example, the Median-Band approach may be used to increase, the monitoring system's sensitivity to changes in the TSCCs.

At block 216, the set of TSCCs may be determined using the corresponding equation for the chosen deployment strategy. These TSCC values may be sent form the training phase to the run-time phase, where the TSCC strategy will be deployed. Thereafter, the signal may be monitored using the TSCC spectrum which was determined in the training phase.

Figure 3:
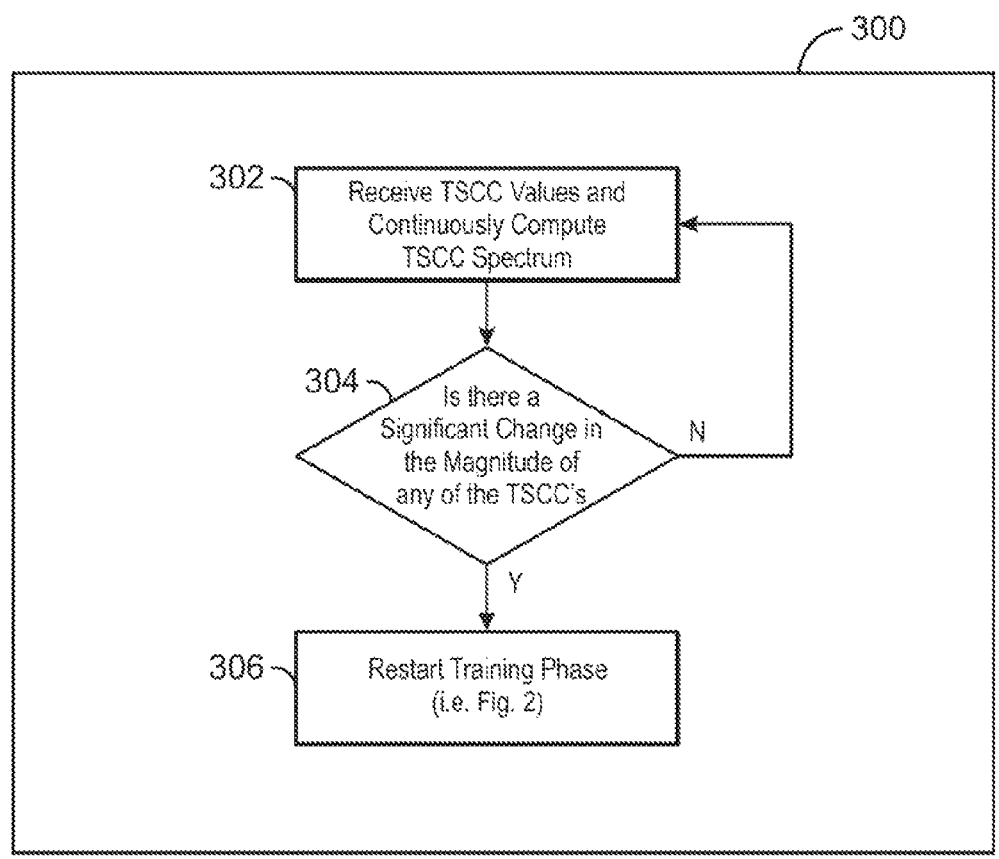
FIG. 3 is a process flow diagram showing the deployment or run-time phase of a method for compressing signals from a real-time surveillance system, in accordance with embodiments.

FIG. 3 is a process flow diagram 300 showing the deployment or run-time phase of a method for compressing signals from a real-time surveillance system. At block 302 of the deployment phase, the signal is monitored by continuously receiving incoming TSCC values from the training phase and computing the TSCC spectrum, $F_C$. Because the TSCC spectrum contains contents that are related to the changes in the image signal and not the actual image itself, the monitoring information may be transmitted across a non-secure connection without compromising the privacy of the information. In addition, this method provides for a reduction in power use for surveillance equipment, such as video camera sensors, since only a small number of bits are transmitted at any given time.

At block 304, the changes in the TSCCs may be determined to determine if the changes are above or below a predetermined threshold value. In an embodiment, any changes in the magnitude of any of the TSCCs may be calculated according to Eqn. 8.

$$\|F_n\|_{current}^2 - \|F_n\|_{historical}^2 > \varepsilon \qquad \text{Eqn. 8}$$

In Eqn. 8, the historical value for the magnitude of each TSCC, termed $\|F_n\|_{historical}^2$, is subtracted from the current value for the magnitude of each TSCC, termed $\|F_n\|_{current}^2$, to determine if the difference is above or below a given threshold, $\varepsilon$. The sensitivity of the system may be set such that an appropriate reaction, such as the triggering of an alarm, may occur when any, all, or some predetermined amount of the differences in magnitude of the TSCCs exceed the threshold value. In addition, the sensitivity of the system may be controlled by a threshold value, $\varepsilon$, which may be specified by the user. For reasonably noisy channels, for example, it may be desirable to choose a relatively high threshold value or to set the system to trigger a response only when a high percentage of the differences in the TSCC magnitudes exceed the threshold value.

As discussed above, if the difference in magnitude of any or all of the TSCCs exceeds the predetermined threshold value, a downstream event may be triggered. This may include the activation of an alarm system or other security device. In addition, the sampling rate and bandwidth may be increased to increase the sensitivity of the system. Once the sampling bandwidth has been altered, the system may be reset at block 306. This causes the signal to be reanalyzed in the training phase to determine the new TSCC values before returning to the deployment stage. Furthermore, if an increase in sampling rate and bandwidth is not deemed to be sufficient in the case of above-threshold changes, the system may instantly switch to full video transmission. The proper downstream action may be determined based on the specific application. In an embodiment, the downstream action for a surveillance system in a high-security area may be the activation of an alarm and the transmission of full video data, instead of the compressed data stream. In another embodiment, the downstream action for a surveillance system in a hospital may include alerting medical staff for electrocardiography applications. In yet another embodiment, the downstream action for a surveillance system may include shutting down a printing press for image quality inspection applications.

On the other hand, if the difference in magnitude of any or all of the TSCCs does not exceed the predetermined threshold at block 304, the signal monitoring will continue at block 302 by comparing the previous TSCC values with the new incoming TSCC values to determine the magnitude of any changes in the TSCCs. This signal monitoring phase is a continuous feedback loop that may be terminated when the change in magnitude of any or all of the TSCCs exceeds threshold, as discussed above.

In an embodiment, the current method may also be useful in providing a hardware-based random number generator for security applications. Because the TSCCs are tuned to the most sensitive points in the cumulative spectrum of the signal, introducing variations around these sensitive points should produce more random results than the original signal coefficients. This also means that testing for signal randomness may be as effective as the method of Eqn. 8 for monitoring the TSCC-compressed signal.

Figure 4A:
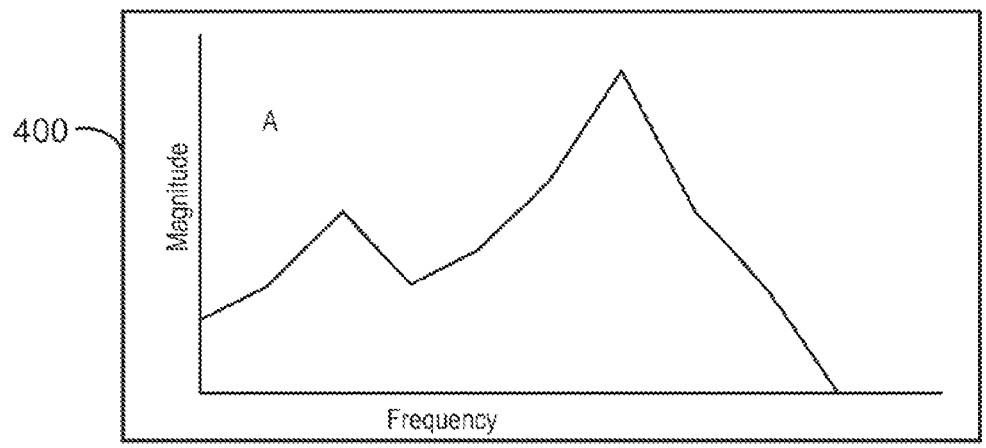
FIG. 4A shows an example of a spectrum for a signal, in accordance with embodiments.

FIG. 4A shows an example of a non-cropped (non-aliased), relatively smooth spectrum 400, which may be obtained from a signal using Eqn. 1. This figure represents an example of the initial full-spectrum analysis of a signal, as discussed above.

Figure 4B:
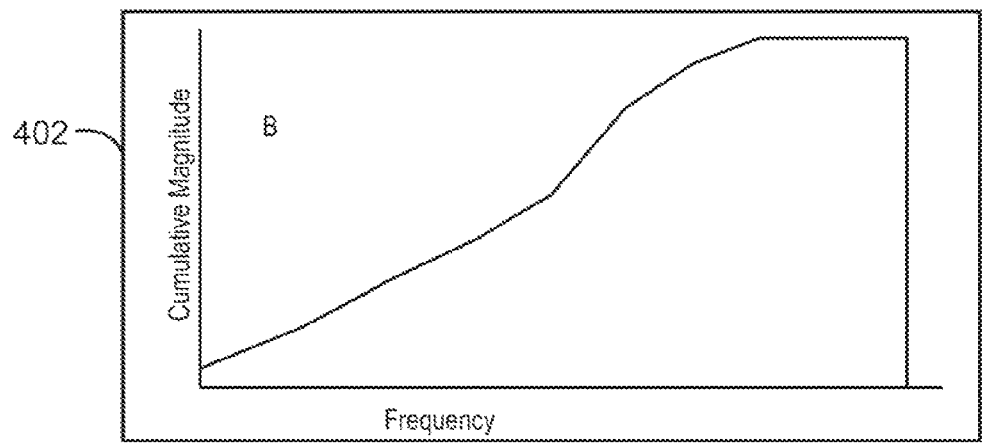
FIG. 4B shows a cumulative spectrum of the signal, in accordance with embodiments.

FIG. 4B shows an example of a cumulative spectrum 402 for a signal, which may be obtained using Eqn. 3. In order to determine the cumulative spectrum of the signal, however, a normalized spectrum of the signal may be obtained using Eqn. 2. Therefore, this figure represents the cumulative spectrum which may be obtained by determining a normalized spectrum from the spectrum in FIG. 4A and sing that u to determine a cumulative spectrum of the signal.

Figure 4C:
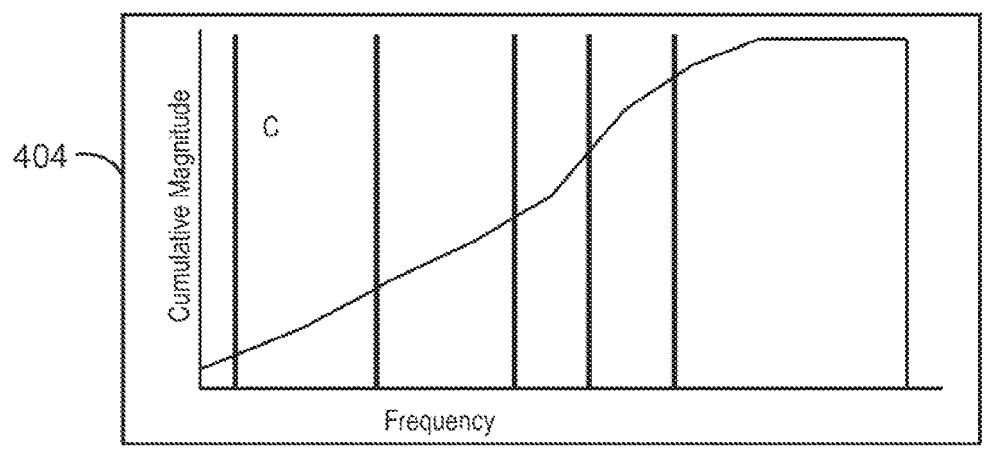
FIG. 4C shows a cumulative spectrum of the signal with cepstral frequencies indicated by vertical lines, in accordance with embodiments.

FIG. 4C shows an example of a cumulative spectrum 404 for a signal with cepstral frequencies indicated by vertical line segments. After the cumulative spectrum has been obtained, as shown in FIG. 4B, the frequencies at which the cumulative spectrum reaches certain values are noted. These are the specific cepstral frequencies for the spectrum, which may be determined for each signal independently according to the deployment strategy which will be used to monitor the TSCCs. In this case, a Median-Band deployment strategy has been chosen, and the cepstral frequencies correspond to cumulative spectrum values of {0.1, 0.3, 0.5, 0.7 and 0.9}.

Figure 5:
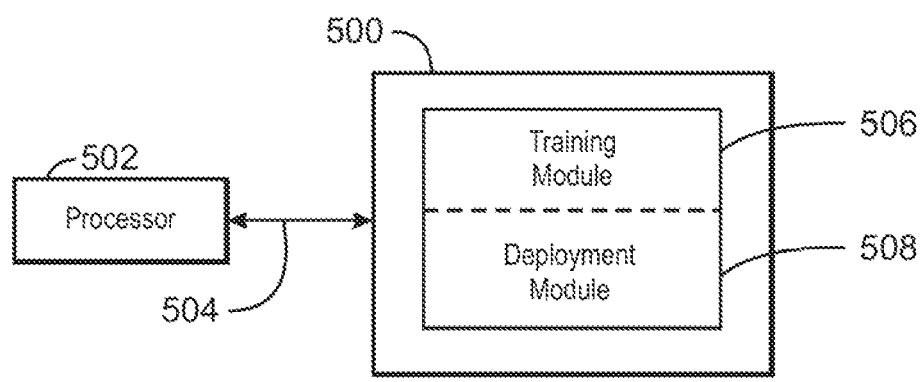
FIG. 5 is a block diagram showing a tangible, computer-readable medium that stores code adapted to compress data from real-time surveillance systems, in accordance with embodiments.

FIG. 5 is a block diagram showing a tangible, computer-readable medium that stores code adapted to compress data from real-time surveillance systems. The tangible, computer-readable medium 500 may be accessed by a processor 502 over a computer bus 504. Furthermore, the tangible, computer-readable medium 500 may include code configured to direct the processor 502 to perform the steps of the current method. The various software components discussed herein may be stored on the tangible, computer-readable medium as indicated in FIG. 5. For example, a training module 506 may be stored at a first block on the tangible, computer-readable medium 500, and a deployment module 508 may be stored at a second block. Embodiments are not limited to this arrangement, however, as different combinations or arrangements may be used to perform the same functions.

What is claimed is:

1. A method for compression of a real-time surveillance signal, comprising:
    receiving a signal from a monitoring device;
    analyzing the signal to compute spectral content of the signal;
    computing information content of the signal, wherein computing the information content comprises computing a number of bits of information in the signal;
    automatically selecting, using a processor, how many coefficients to use to represent the signal to be monitored based on the information content of the signal, wherein selecting how many coefficients comprises selecting a number of coefficients that is greater than the number of bits of information multiplied by a constant;
    deploying a strategy for computing a plurality of coefficients based on the spectral content of the signal and how many coefficients were determined to be used for representing the signal; and
    monitoring the signal and resetting the system in case of above-threshold changes in a selected portion of the plurality of coefficients.

2. The method of claim 1, wherein the monitoring device comprises a video recorder, surveillance system, camera, mobile device, or any combination thereof.

3. The method of claim 1, wherein analyzing the signal to compute spectral content comprises:
    determining the full spectrum of the signal;
    determining the normalized spectrum of the signal; and
    determining the cumulative spectrum of the signal.

4. The method of claim 3, wherein determining the cumulative spectrum of the signal comprises utilizing the normalized spectrum to compute the cumulative magnitude of the spectrum at different frequencies.

5. The method of claim 1, wherein computing the information content of the signal comprises using Shannon's method to measure the number of bits of information provided in a channel.

6. The method of claim 1, wherein selecting how many coefficients comprises selecting a count of a number of task-specific cepstral coefficients (TSCCs) to represent the signal by determining a lowest integer that is greater than the number of bits per channel, bits per sensor, or bits per image, or any combinations thereof.

7. The method of claim 1, wherein deploying a strategy for computing a plurality of coefficients comprises selecting a deployment strategy from an Optimal-Spread approach, a Median-Band approach, a Jitter approach, an anticipatory approach, a tiled approach, or any combination thereof.

8. The method of claim 1, wherein monitoring the signal comprises:
    iteratively calculating the values of the plurality of coefficients; and
    comparing the values of each of the plurality of coefficients to the previous value to verify that a predetermined percentage of the plurality of coefficients remain within a predetermined range.

9. The method of claim 1, wherein resetting the system in response to significant changes in magnitude of the coefficients comprises sampling the signal at a higher bandwidth and restarting the initial training phase by performing a full-spectrum analysis of the signal.

10. The method of claim 9, wherein significant changes in magnitude comprise changes in any, all, or a subset of the coefficients which are above the predetermined threshold value for allowable changes, as specified by the user.

11. The method of claim 9, wherein sampling the signal at a higher bandwidth comprises instantly replacing the low-bandwidth monitoring with higher-bandwidth or full video transmission monitoring.

12. A computer system for compression of a real-time surveillance signal, comprising:
    a processor that is adapted to execute stored instructions;
    a memory device that stores instructions that are executable by the processor, the instructions comprising:
        a training module to analyze a signal to be monitored to compute spectral content of the signal, compute information content of the signal based on a number of bits of information contained in the signal, automatically select how many coefficients to use to monitor the signal based on the information content of the signal, the how many coefficients selected based on a lowest integer greater than the number of bits multiplied by a constant, and deploy a strategy for computing a plurality of coefficients based on the spectral content of the signal and how many coefficients were determined to be used for monitoring the signal; and
        a deployment module to monitor the signal and reset the system in case of above-threshold changes in a selected portion of the plurality of coefficients.

13. The system of claim 12, wherein the deployment module comprises code configured to repeatedly calculate the changes in magnitude of the coefficients in a feedback loop in which the current value of each of the plurality of coefficients is compared to the previous value of each of the plurality of coefficients.

14. The system of claim 13, wherein the continuous feedback loop is uninterrupted unless the change in magnitude of the coefficients is above a predetermined threshold value, in which case the system is restarted.

15. A non-transitory computer-readable medium, comprising code configured to direct a processor to:
    utilize a training phase to analyze the signal to be monitored to compute spectral content, compute the information content of the signal, automatically select how many coefficients to use to monitor the signal based on the information content of the signal, and deploy a strategy for computing a plurality of coefficients based on the spectral content of the signal and how many coefficients were determined to be used for monitoring the signal; and utilize a deployment phase to monitor the signal and reset the system in the case of above-threshold changes in a selected portion of the plurality of coefficients.

16. The system of claim 12, wherein the deployment module is to indicate the reset to the training module, and wherein based on the indicated reset, the training module is to restart a training phase, wherein in the training phase, the training module is to again analyze the signal to compute the spectral content, compute the information content of the signal, determine how many coefficients to use to monitor the signal, and deploy the strategy for computing the plurality of coefficients.

17. The method of claim 1, wherein monitoring the signal comprises generating the plurality of coefficients according to the deployed strategy, detecting the above-threshold changes in the selected portion of the plurality of coefficients, and based on the detecting, restarting a training phase to again generate the plurality of coefficients.

18. The method of claim 17, further comprising based on the detecting, again determining the strategy based on the information content of the signal.

19. The method of claim 1, wherein the constant is one.

20. The system of claim 12, wherein the constant is one.

* * * * *